3,291,722
HYDROCARBON CONVERSION PROCESS STARTUP PROCEDURE
John H. Taylor, Warton, near Preston, England, and Harold F. Mason, Berkeley, Calif., assignors to Chevron Research Company, a corporation of Delaware
No Drawing. Filed Nov. 19, 1963, Ser. No. 324,839
1 Claim. (Cl. 208—110)

This invention relates to an improved procedure for the hydrogen treatment of hydrocarbons and in particular to an improved startup procedure for such hydrogen treatment.

It points out in Bercik et al. U.S. Patent 2,953,519 that hydrogen treatment of hydrocarbons can be catalyzed with metal sulfides, particularly tungsten sulfide-nickel sulfide mixtures, that destructive hydrogenation may be carried out in the presence of these catalysts, that a startup procedure with these catalysts involving pre-reduction in hydrogen at 800° to 850° F. for about 4 hours is a procedure that harms the catalyst, and that a much better procedure is to maintain the catalyst surface in a wetted condition while in the presence of hydrogen at a temperature of above about 275° to 300° F. Bercik et al. teach that their better procedure is accomplished by introducing the liquid hydrocarbon charge stock to be hydrogen treated into the reactor before the reactor is heated above 275° to 300° F. in amounts sufficient to completely wet the catalyst with the liquid hydrocarbon, and by continuing introduction of the hydrogen while maintaining the catalyst in wetted condition until reaction temperature is reached. In their procedure Bercik et al. purge the catalyst bed with hydrogen in the absence of liquid hydrocarbons at atmospheric temperature, or a somewhat elevated temperature, and preferably at about reaction pressure, gradually raise the temperature during the hydrogen purge until a reaction temperature is reached, but before a temperature of 275° to 300° F. is reached, and introduce sufficient liquid hydrocarbon purge stock to completely wet the catalyst and to maintain the catalyst in a wetted condition until reaction temperature is reached.

It is apparent that in the Bercik et al. procedure they avoid the harmful effect of prior startup procedures by avoiding reduction of their catalyst in the sulfide form to a catalyst in the metal form. They discovered that in their procedure the catalyst had higher hydrocracking and saturative hydrogenation activities than sulfided catalysts which had been reduced to the metal form by hydrogen treatment.

It has now been found that nickel-tungsten sulfide catalysts, and particularly nickel-tungsten sulfide catalysts on a silica-magnesia support, may be used to great advantage in various processes for hydrogen treatment of hydrocarbons by starting up said processes in a manner which is different from both the Bercik et al. startup process and from the startup processes of the art prior to the Bercik et al. process.

In accordance with the present invention there is provided, in the starting up of a process comprising hydrogen treatment of a liquid hydrocarbon at a temperature between about 450° and 900° F., a pressure between about 250 and 10,000 p.s.i. and a liquid hourly space velocity of from 0.1 to 4.0 in a reactor containing a bed of hydrogenation catalyst comprising a compound of nickel and a compound of tungsten, the improvement which comprises passing hydrogen through said catalyst bed at a temperature below 300° F. and a pressure below 250 p.s.i.g. with said catalyst in the oxide form, raising said pressure to above 800 p.s.i.g., contacting said catalyst bed with a sulfur-containing hydrocarbon feed and hydrogen at a temperature below 300° F., increasing the temperature to reaction temperature while continuing the flow of said feed and said hydrogen, and during said latter step holding the temperature essentially constant at a value below about 650° F. for a period of time from 2 to 48 hours.

The hydrogen treatment processes with which the present startup procedure may be used include both hydrofining and hydrocracking. The procedure is especially effective in a process for concurrently hydrofining and hydrocracking a hydrocarbon feed to produce middle distillates therefrom which comprises contacting said feed at reaction conditions of from 500° to 900° F., 500 to 3500 p.s.i.g., and 0.1 to 4.0 LHSV, in the presence of from 1000 to 10,000 s.c.f. of hydrogen per barrel of said feed, with a catalyst consisting essentially of a compound of nickel and a compound of tungsten, preferably in a sulfided condition during the post startup period, on a silica-magnesia support, said nickel being present in an amount from one to 20 weight percent, based on the total catalyst composite and said tungsten being present in an amount from one to 40 weight percent, based on the total catalyst composite. The present startup procedure also is of utility in connection with other processes for the hydrogen treatment of liquid hydrocarbons, for example hydrodesulfurization, hydrogenation of furnace oils, hydrogenation of lubricating oil stocks, etc., said other processes being discussed in more detail in the aforesaid Bercik et al. patent.

Suitable feeds for use in the processes to which the present startup procedure is applicable include petroleum distillates boiling from 200 to 1100° F., preferably petroleum distillates boiling from 500 to 1100° F., petroleum residua boiling above 500° F., mixtures of the foregoing, and various nitrogen-containing and sulfur-containing stocks derived from shale oil, Athabasca tar sand, and gilsonite.

In the startup procedure of the present invention it will be noted that the procedure is begun with the catalyst in the oxide form, rather than in the sulfide form as in the Berick et al. process. Accordingly there is no need for use of a sulfiding agent such as $H_2S$. With a sulfiding agent such as $H_2S$, a catalyst may be sulfided at ambient temperatures, but then according to the aforesaid Berick et al. teaching care must be taken not to reduce the sulfide to metal. To the contrary, the startup procedure of the present invention is begun with the catalyst in the oxide form, and it is maintained in the oxide form until subsequent sulfiding which is accomplished by reducing sulfur compounds in the feed instead of by use of a sulfiding agent. Contrary to the behavior of a sulfiding agent such as $H_2S$, the sulfur compounds in the feed will not reduce and cause sulfiding of the catalyst until the catalyst temperature is elevated to a temperature much higher than ambient temperature, for example above about 350° to 400° F. The sulfur compounds in the feed tend to be reduced more readily as the pressure is raised.

In the startup procedure of the present invention it is essential that a deep reduction of the catalyst in the oxide form to the metal form must be avoided prior to sulfiding; accordingly reduction to metal at temperatures below about 400° F. must be avoided. Signficant reduction will not begin to occur until the temperature is elevated to about 300° F. The temperature at which reduction will occur is affected little by pressure. While some reduction may occur between about 300° F., when reduction begins, and about 400° F., when sulfiding from sulfur compounds in the feed begins, sulfiding is accomplished before the catalyst can become reduced to any substantially extent. In addition, excessive hydrocracking is avoided because sulfiding is completed before any substantial reduction to the metal form of the catalyst which causes excessive hydrocracking.

In an especially prefererd method of practicing the startup procedure of the present invention, the hydrocarbon feed is passed over the catalyst for a sustained period of time under conditions such that no substantial hydrocracking will occur; it has been found that by maintaining the passage of feed over the catalyst under non-hydrocracking conditions for said period of time the catalyst is enabled to become equilibrated with nitrogen and other contaminating compounds in the feed, and excessive hydrocracking activity of the catalyst is ameliorated. Said sustained period of time to accomplish the indicated results may be termed an incubation period. With a hydrocarbon feed containing no nitrogen, a nickel sulfide-tungsten sulfide on silica-magnesia hydrocracking catalyst will accomplish hydrocracking at about 650° F., whereas with a nitrogen-containing feed it will accomplish hydrocracking at around 730° F. Accordingly with a feed containing no nitrogen the incubation period generally can be at a temperature of about 550° to 650° F.

In a preferred manner of practicing the startup procedure of the present invention the hydrogen purge of the catalyst bed is accomplished at a low pressure, for example below about 100 p.s.i.g., in contrast to the hydrogen purge in the process of the Bercik et al, patent which preferably is accomplished at reaction pressure. It has been found that the low pressure hydrogen purge minimizes generation of harmful water vapor, reduces heat of reaction during subsequent catalyst sulfiding, and particularly in combination with the aforesaid incubation step maintains catalyst activity at a maximum value.

We claim:

In the starting up of a process comprising hydrogen treatment of a liquid hydrocarbon at a temperature between about 450° and 900° F., a pressure between about 250 and 10,000 p.s.i. and a liquid hourly space velocity of from 0.1 to 4.0 in a reactor containing a bed of hydrogenation catalyst comprising a compound of nickel and a compound of tungsten, the improvement which comprises passing hydrogen through said catalyst bed at a temperature below 300° F. and a pressure below 250 p.s.i.g. with said catalyst in the oxide form, raising said pressure to above 800 p.s.i.g., contacting said catalyst bed with a sulfur-containing hydrocarbon feed and hydrogen at a temperature below 300° F., increasing the temperature to reaction temperature while continuing the flow of said feed and said hydrogen, and during said latter step holding the temperature essentially constant at a value below about 650° F. for a period of time from 2 to 48 hours.

References Cited by the Examiner

UNITED STATES PATENTS 2,953,519  9/1960  Bercik _____ 208—216

DELBERT E. GANTZ, *Primary Examiner.*

SAMUEL P. JONES, *Examiner.*